United States Patent Office 3,009,941
Patented Nov. 21, 1961

3,009,941
METHOD FOR PREPARING ORGANOBORON COMPOUNDS
Robert J. Brotherton, Fullerton, and William G. Woods, Anaheim, Calif., assignors to United States Borax & Chemical Corporation, Los Angeles, Calif., a corporation of Nevada
No Drawing. Filed Aug. 17, 1960, Ser. No. 50,068
8 Claims. (Cl. 260—462)

This invention relates as indicated to a method for preparing organoboron compounds and has more particular reference to the preparation of organoboron compounds having boron-boron bonds.

This syntheses of organic compounds having boron-boron bonds have in the past been tedious, time consuming, expensive and have resulted in yields of questionable end products.

It is therefore the principal object of the present invention to provide a new method for preparing boron-boron systems.

It is a further object of this invention to provide a method for producing boron-boron systems which is economical, efficient and results in yields of substantially pure product.

Other objects of the present invention will appear as the description proceeds.

To the accomplishment of the foregoing and related ends, said invention then comprises the features hereinafter fully described and pointed out in the claims, the following description setting forth in detail certain illustrative embodiments of the invention, these being indicative, however, of but a few of the ways in which the principle of the invention may be employed.

Broadly stated, the present invention comprises the method for preparing organoboron compounds having boron-boron bonds which comprises heating under reflux, in an inert atmosphere, with constant agitation, a cyclic organoboron compound selected from the group consisting of 2-halo-1,3,2-dioxaborolanes, 2-halo-1,3,2-dioxaborinanes, 2 - halo - 1,3,2 - benzodioxaboroles, 2-halo-1,3,2-diazaboroles, 2-halo-1,3,2-diazaborinanes and 2-halo-1,3,2-benzodiazaboroles and a metal having a continuously available clean active surface, said metal selected from the group consisting of the alkali metals, sodium and potassium alloys and sodium amalgam, in the presence of a tertiary amine selected from the group consisting of pyridine and tertiary alkyl amines having primary and secondary alkyl groups, and recovering said boron-boron bonded compound from the reaction mass.

The process described in the foregoing broadly stated paragraph can best be represented by the following general equations:
(1) The reaction of 2-halo-1,3,2-dioxaborolanes

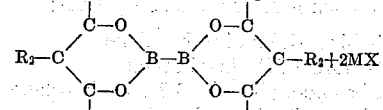

(2) The reaction of 2-halo-1,3,2-dioxaborinanes

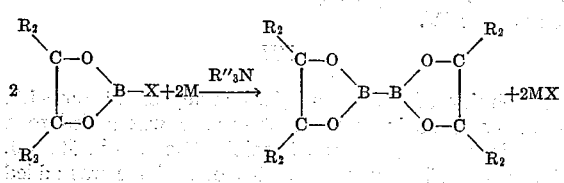

(3) The reaction of 2-halo-1,3,2-benzodioxaborole

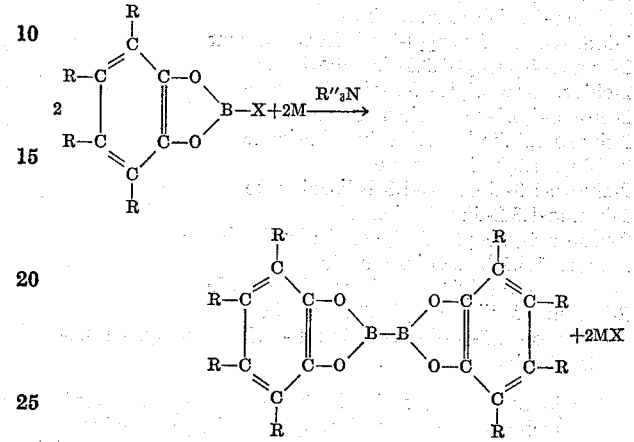

(4) The reaction of 2-halo-1,3,2-diazaboroles

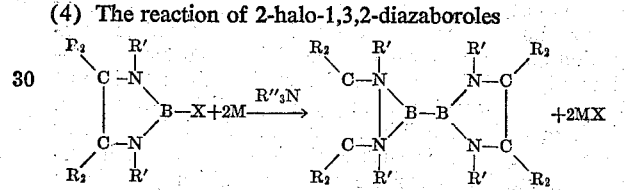

(5) The reaction of 2-halo-1,3,2-diazaborinanes

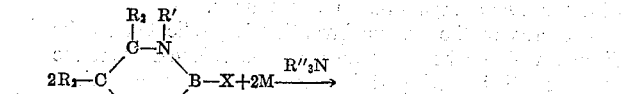

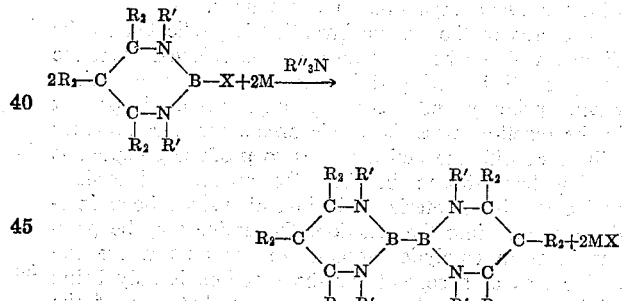

(6) The reaction of 2-halo-1,3,2-benzodiazaboroles

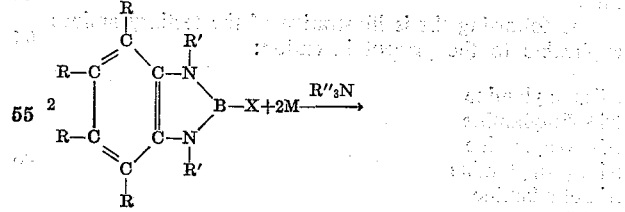

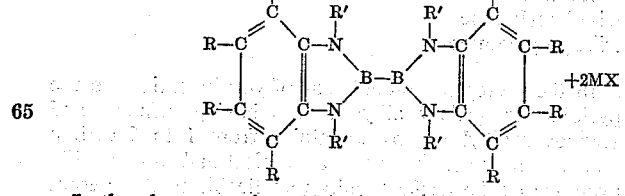

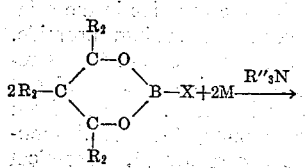

In the above reactions M is the active metal, R″$_3$N is a tertiary amine, X is halogen, R is hydrogen, alkyl groups containing from 1 to 6 carbon atoms, phenyl or alkyl substituted phenyl or any combination of these groups and R' is hydrogen, phenyl or primary or secondary alkyl groups containing from 1 to 6 carbon atoms.

Referring to the cyclic organoboron compounds which are applicable to the present invention, the following list is illustrative of these compounds:

2-chloro-1,3,2-dioxaborolane
2-fluoro-1,3,2-dioxaborinane
2-bromo-4-phenyl-1,3,2-dioxaborolane
2-iodo-1,3,2-benzodioxaborole
2-bromo-4,5-dimethyl-1,3,2-dioxaborinane
2-fluoro-4,5-dibutyl-1,3,2-dioxaborolane
2-chloro-1,3,2-benzodioxaborole
2-iodo-4-ethyl-5-propyl-1,3,2-dioxaborolane
2-bromo-4-phenyl-1,3,2-dioxaborinane
2-chloro-4-(p-tolyl)1,3,2-dioxaborolane
2-bromo-1,3,2-benzodioxaborole
2-fluoro-4,5-diethyl-1,3,2-dioxaborinane
2-chloro-1,3,2-diazaborole
2-chloro-1,3-dimethyl-1,3,2-diazaborole
2-bromo-1,3,2-diazaborinane
2-bromo-4-phenyl-1,3-diphenyl diazaborinane
2-fluoro-1,3,2-benzodiazaborole
2-fluoro-4-(p-tolyl)-1,3,2-benzodiazaborole
2-bromo-4,5-diisopropyl-1,3,2-diazaborole
2 - chloro - 4,5 - di - sec - butyl - 1,3 - dimethyl - 1,3,2-diazaborinane It will be noted that in the broadly stated paragraph the reducing metal is specifically described as having a continuously available clean active surface. This is of utmost importance for the reaction to proceed to completion and to obtain maximum yields. To have a continuously available clean active surface the metal must be either dispersed in a very small particle size or in a liquid or molten condition. Thus in effect it is necessary to have the metal in such a physical state where it presents a maximum surface area and which provides a continuously available active clean surface for reaction with the cyclic organoboron compounds.

The crux of the present invention is predicated on the discovery that when a tertiary amine, selected from the group consisting of pyridine and tertiary alkyl amines having primary and secondary alkyl groups, is present in the reaction mass the cyclic organoboron compounds will react with the active metals to produce compounds having boron-boron bonds. The amount of tertiary amine used is immaterial to the invention since the amines do not enter into the reaction; the amine may be present in from catalytic amounts to amounts where the amine acts as a solvent for the reaction, it only being of importance to the present process that one of the defined tertiary amines is present in the reaction mixture.

The following list is illustrative of the tertiary amines applicable to the present invention:

triisoamylamine
triisobutylamine
tri-n-octylamine
tri-n-propylamine
trimethylamine
pyridine
triethylamine
tri-n-hexylamine
triisopropylamine In the preferred embodiment of our invention we use pyridine or tertiary alkyl amines having primary and secondary alkyl groups containing from 1 to 6 carbon atoms as they are the most economical and most readily available of the tertiary amines applicable to the present invention.

So that the present invention can be more clearly understood, the following examples are given for illustrative purposes:

I

A solution of 71.45 grams (0.46 mole) of 2-chloro-1,3,2-benzodioxaborole in 100 ml. of xylene was added to a dispersion of 11.0 grams (0.48 mole) of sodium in 450 ml. of xylene. Five ml. (0.036 mole) of triethylamine was added and the mixture was vigorously agitated for about three hours in a nitrogen atmosphere under reflux. Analysis of the reaction mass showed that all of the chlorine in the original chloroborane had been converted to sodium chloride. The reaction mixture was filtered, the xylene was removed from the filtrate by distillation at reduced pressure, and a crude semi-solid product was recovered. Sublimation of the crude product yielded the diboron compound, 2-(1,3,2 - benzodioxaborolo) - 1,3,2-benzodioxaborole. Chemical analysis of the recovered product yielded the following data:

Calculated for $C_{12}H_8O_4B_2$: percent B = 9.12%; mol. wt. = 337. Found in product: percent B = 8.89%; mol. wt. = 339.

II

Example I was repeated except that a highly dispersed potassium was used instead of sodium as the active metal. The product was comparable to that in Example I.

III

Example I was repeated except that 100 ml. (0.72 mole) of triethylamine was used instead of 5 ml. (0.036 mole). The same product and reaction rate as per Example I were noted.

IV

A solution of 31.0 grams (0.26 mole) of 2-chloro-1,3,2-dioxaborinane in 50 ml. of toluene was added to a dispersion of 6.5 grams (0.28 mole) of sodium in 250 ml. of toluene. Five ml. (0.036 mole) of triethylamine was added and the mixture was vigorously agitated for about one hour in an inert atmosphere and under reflux. Analysis of the reaction mass showed that the chlorine in the original chloroborane had converted to sodium chloride. The reaction mixture was filtered and the toluene was removed from the filtrate by distillation at reduced pressure and a high boiling residual liquid, the diboron compound, 2-(1,3,2-dioxaborinyl) - 1,3,2-dioxaborinane, was recovered. Chemical analysis of the product yielded the following data:

Calculated for: percent B = 12.67%; mol. wt. = 171. Found in product: percent B = 12.44%; mol. wt. = 172.

V

Example IV was repeated using 5 ml. (0.09 mole) of pyridine instead of triethylamine. The product recovered was comparable to that of Example IV.

VI

Example IV was repeated using 27.0 grams (0.26 mole) of the reaction mass showed that the bromine in the orig-compound. The product recovered was the same as that of Example IV.

VII

A solution of 100 grams (0.67 mole) of 2-bromo-1,3,2-dioxaborolane in 100 ml. of toluene was added to a dispersion of 16 grams (0.69 mole) of sodium in 500 ml. of toluene. Five ml. (0.09 mole) of pyridine was added and the mixture was vigorously agitated for about one hour in a nitrogen atmosphere under reflux. Analysis of the reaction mass showed that the bromine in the original bromoborane was converted to sodium bromide. The reaction mixture was filtered and the toluene was removed from the filtrate by distillation under reduced pressure. The recovered material was redistilled from toluene and the diboron compound, 2-(1,3,2-dioxaborolyl) - 1,3,2 - dioxaborolane was recovered. Chemical analysis of the recovered product yielded the following data:

Calculated for $C_4H_8O_4B_2$: percent B = 15.16%; mol. wt. = 143. Found in product: percent B = 15.01%; mol. wt. = 144.

VIII

Example VII was repeated except that sodium amalgam was used instead of sodium. The product recovered was the same as in Example VII, except that the reaction time was about two hours.

IX

A solution of 66.2 grams (0.5 mole) of 2-chloro-1,3-dimethyl-1,3,2-diazaborole in 100 ml. of xylene was added to a dispersion of 11.8 grams (0.51 mole) of sodium in 500 ml. of xylene. Ten ml. (0.072 mole) of triethylamine was added and the mixture was vigorously agitated for about two hours in an inert atmosphere and under reflux. Analysis of the reaction mass showed that the chlorine in the original chloroborane had converted to sodium chloride. The reaction mixture was filtered, and the xylene was removed from the filtrate by distillation at reduced pressure, and a crude solid product was recovered. Sublimation of the crude product yielded the diboron compound, 2-(1,3-dimethyl - 1,3,2-diazaborolo)-1,3-dimethyl-1,3,2-diazaborole. Chemical analysis of the recovered product yielded the following data:

Calculated for $C_8H_{20}N_4B_2$: percent B=11.16%; mol. wt.=194. Found in product: percent B=10.91%; mol. wt.=197.

X

Example IX was repeated using 5 ml. (0.09 mole) of pyridine in place of the 10 ml. (0.072 mole) of triethylamine. The produced recovered was substantially the same as that of Example IX.

XI

A solution of 63 grams (0.32 mole) of 2-bromo-1,3,2-benzodiazaborole in 100 ml. of toluene was added to a dispersion of 13.3 grams (0.34 mole) of potassium in 500 ml. of toluene. Five ml. (0.09 mole) of pyridine was added and the mixture was vigorously agitated for about one hour in an inert atmosphere and under reflux. Analysis of the reaction mass showed that the bromine in the original bromoborane had converted to potassium bromide. The reaction mixture was filtered, and the toluene was removed from the filtrate by distillation at reduced pressure, and a crude solid product was recovered. Sublimation of the crude product yielded the diboron compound, 2-(1,3,2 - benzodiazaborolo) - 1,3,2-benzodiazaborole. Chemical analysis of the recovered product yielded the following data:

Calculated for $C_{12}H_{12}N_4B_2$: percent B=9.21%; mol. wt.=234. Found in product: percent B=9.03%; mol. wt.=238.

Examples I, IV, VII and IX were performed several times without the addition of a tertiary amine. In each instance chemical analysis showed that no reaction had taken place after a reflux period of three hours.

From the foregoing it will be seen that we have provided a method for the preparation of organoboron compound having boron-boron bonds. These compounds will be found to have use as herbicides and intermediates in chemical syntheses.

Other modes of applying the principle of the invention may be employed provided the features stated in any of the following claims or the equivalent of such be employed.

We, therefore, particularly point out and claim as our invention:

1. The method for preparing organoboron compounds having boron-boron bonds which comprises heating under reflux, in an atmosphere, with constant agitation, a cyclic organoboron compound selected from the group consisting of 2-halo-1,3,2 - dioxaborolanes, 2-halo-1,3,2-dioxaborinanes, 2-halo-1,3,2-benzodioxaboroles, 2-halo-1,3,2 - diazaboroles, 2-halo-1,3,2 - diazaborinanes and 2-halo-1,3,2-benzodiazaboroles, and a metal having a continuously available clean active surface, said metal selected from the group consisting of the alkali metals, and sodium and potassium alloys, in the presence of a tertiary amine selected from the group consisting of pyridine and tertiary alkyl amines having primary and secondary alkyl groups containing from 1 to 6 carbon atoms, and recovering said boron-boron bonded compound from the reaction mass.

2. The method for preparing organoboron compounds having boron-boron bonds which comprises heating under reflux, in an inert atmosphere, with constant agitation, a cyclic organoboron compound selected from the group consisting of 2-halo-1,3,2 - dioxaborolanes, 2-halo-1,3,2-dioxaborinanes, 2-halo-1,3,2-benzodioxaboroles, 2-halo-1,3,2 - diazaboroles, 2-halo-1,3-2 - diazaborinanes and 2-halo-1,3,2-benzodiazaboroles, and highly dispersed sodium in the presence of a tertiary amine selected from the group consisting of pyridine and tertiary alkyl amines having primary and secondary alkyl groups containing from 1 to 6 carbon atoms, and recovering said boron-boron bonded compound from the reaction mass.

3. The method for preparing organoboron compounds having boron-boron bonds which comprises heating under reflux, in an inert atmosphere, with constant agitation, a 2-halo-1,3,2-dioxaborolane and a metal having a continuously available clean active surface, said metal selected from the group consisting of the alkali metals, and sodium and potassium alloys in the presence of a tertiary amine selected from the group consisting of pyridine and tertiary alkyl amines having primary and secondary alkyl groups containing from 1 to 6 carbon atoms, and recovering said boron-boron bonded compound from the reaction mass.

4. The method for preparing organoboron compounds having boron-boron bonds which comprises heating under reflux, in an inert atmosphere, with constant agitation, a 2-halo-1,3,2-dioxaborinane and a metal having a continuously available clean active surface, said metal selected from the group consisting of the alkali metals, and sodium and potassium alloys in the presence of a tertiary amine selected from the group consisting of pyridine and tertiary alkyl amines having a primary and secondary alkyl groups containing from 1 to 6 carbon atoms, and recovering said boron-boron bonded compound from the reaction mass.

5. The method for preparing organoboron compounds having boron-boron bonds which comprises heating under reflux, in an inert atmosphere, with constant agitation, a 2-halo-1,3,2-benzodioxaborole and a metal having a continuously available clean active surface, said metal selected from the group consisting of the alkali metals, and sodium and potassium alloys in the presence of a tertiary amine selected from the group consisting of pyridine and tertiary alkyl amines having primary and secondary alkyl groups containing from 1 to 6 carbon atoms, and recovering said boron-boron bonded compound from the reaction mass.

6. The method for preparing organoboron compounds having boron-boron bonds which comprises heating under reflux, in an inert atmosphere, with constant agitation, a 2-halo-1,3,2-diazaborole and a metal having a continuously available clean active surface, said metal selected from the group consisting of the alkali metals, and sodium and potassium alloys in the presence of a tertiary amine selected from the group consisting of pyridine and tertiary alkyl amines having primary and secondary alkyl groups containing from 1 to 6 carbon atoms, and recovering said boron-boron bonded compound from the reaction mass.

7. The method for preparing organoboron compounds having boron-boron bonds which comprises heating under reflux, in an inert atmosphere, with constant agitation, a 2-halo-1,3,2-diazaborinane and a metal having a continuously available clean active surface, said metal selected from the group consisting of the alkali metals, and sodium and potassium alloys in the presence of a tertiary amine selected from the group consisting of pyridine and tertiary alkyl amines having primary and secondary alkyl groups containing from 1 to 6 carbon atoms, and recovering said boron-boron bonded compound from the reaction mass.

8. The method for preparing organoboron compounds having boron-boron bonds which comprises heating under reflux, in an inert atmosphere, with constant agitation, a 2-halo-1,3,2-benzodiazaborole and a metal having a continuously available clean active surface, said metal selected from the group consisting of the alkali metals, and sodium and potassium alloys in the presence of a tertiary amine selected from the group consisting of pyridine and tertiary alkyl amines having primary and secondary alkyl groups containing from 1 to 6 carbon atoms, and recovering said boron-boron bonded compounds from the reaction mass.

No references cited.

UNITED STATES PATENT OFFICE
CERTIFICATE OF CORRECTION

Patent No. 3,009,941

November 21, 1961

Robert J. Brotherton et al.

It is hereby certified that error appears in the above numbered patent requiring correction and that the said Letters Patent should read as corrected below.

Column 5, line 74, after "an" insert -- inert --; column 6, line 46, strike out "a"; column 8, line 9, for "compounds" read -- compound --.

Signed and sealed this 10th day of April 1962.

(SEAL)
Attest:

ERNEST W. SWIDER
Attesting Officer

DAVID L. LADD
Commissioner of Patents